Sept. 13, 1949.  J. E. BEVINS  2,481,563
CHART EVALUATOR
Filed Feb. 14, 1946  2 Sheets-Sheet 1
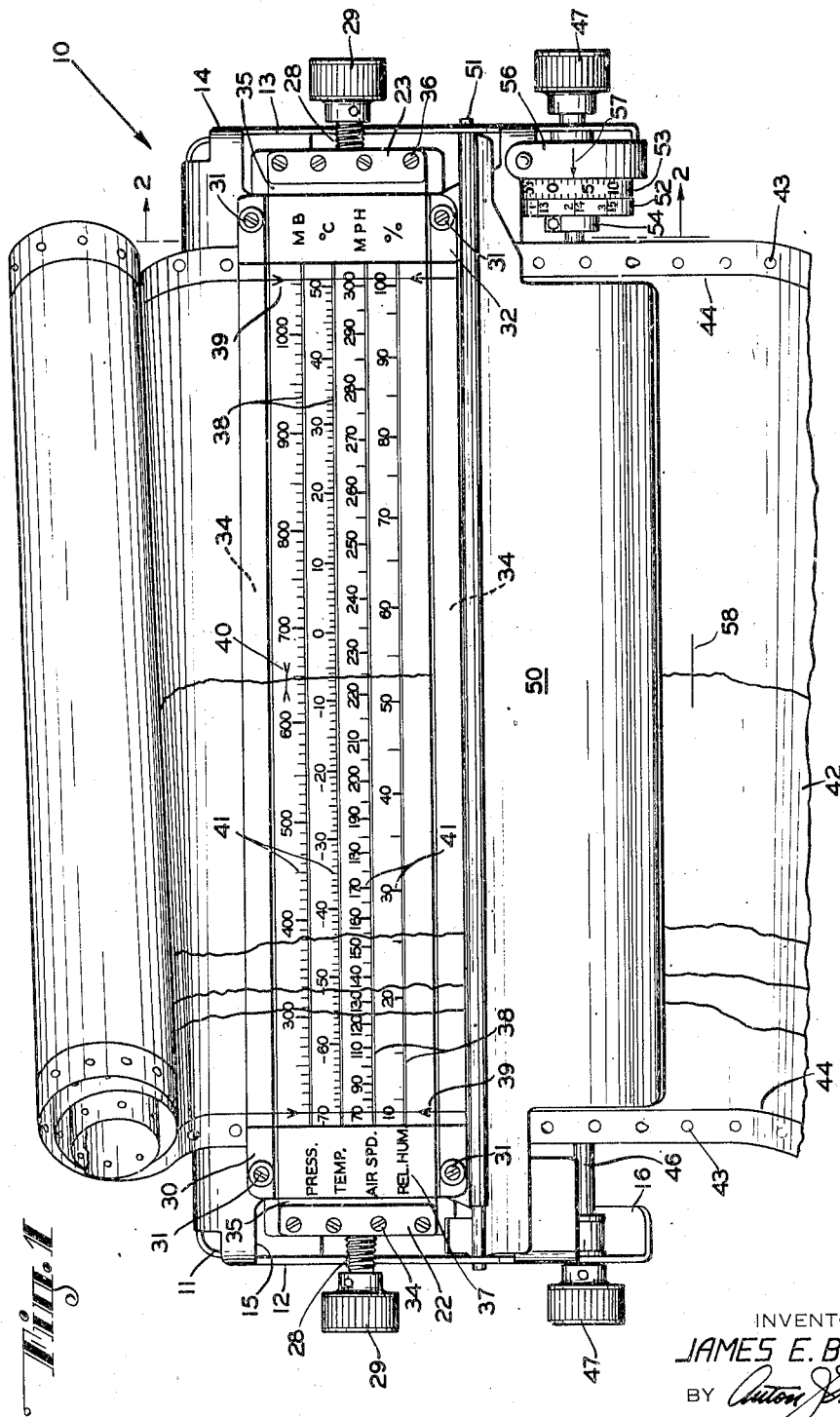
INVENTOR
JAMES E. BEVINS
BY [signature]
ATTORNEY Sept. 13, 1949.  J. E. BEVINS  2,481,563
CHART EVALUATOR
Filed Feb. 14, 1946  2 Sheets-Sheet 2
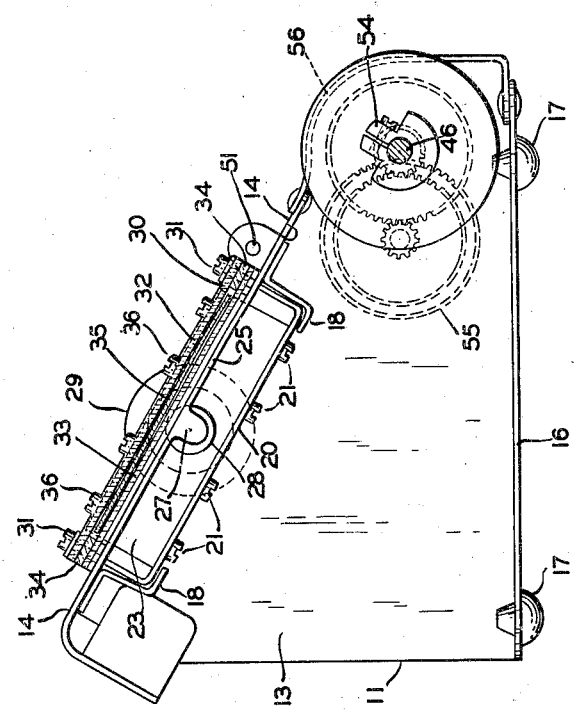
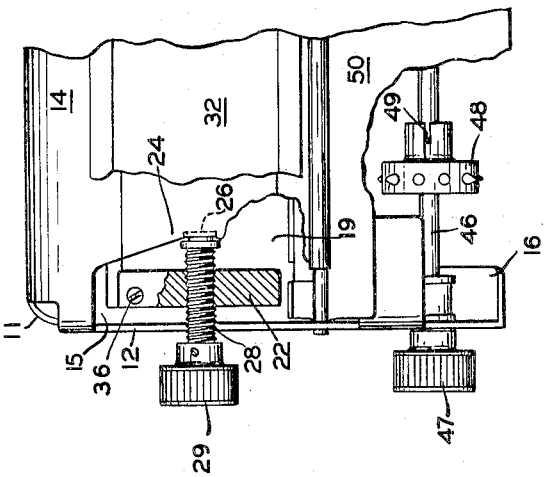
INVENTOR
JAMES E. BEVINS
BY
ATTORNEY Patented Sept. 13, 1949

2,481,563

UNITED STATES PATENT OFFICE 2,481,563

CHART EVALUATOR

James E. Bevins, Ramsey, N. J., assignor to Bendix Aviation Corporation, Teterboro, N. J., a corporation of Delaware Application February 14, 1946, Serial No. 647,481

6 Claims. (Cl. 33—1)

1

This invention relates to a chart evaluator in which compensations may be made for dimensional changes of the chart material due to variations in ambient conditions.

An object of my present invention is to provide a chart evaluator with a transparent elastic scale for compensating the dimensional changes of a chart due to variations of temperature and humidity.

Another object of my invention is to provide a chart evaluator of the character described in which the elastic scale may be adjusted from both ends of the scale to align reference markings thereon with those appearing on the chart.

Still another object of the invention is to provide a chart evaluator of the character described with a chart advancing mechanism having a timing means whereby the time when the reading was recorded on the chart may be ascertained.

A further object of this invention is to provide a chart evaluator of the character described in which the chart advancing mechanism is adjustable to accommodate for dimensional changes in the width of the chart.

Still a further object of the present invention is to provide a rugged and compact chart evaluator of the character described which shall consist of few and simple parts, which shall be relatively inexpensive to manufacture, positive in its operation, which shall have a large variety of applications, and yet be practical and efficient to a high degree in use.

Other objects of this invention will in part be obvious, and in part hereinafter pointed out.

The invention accordingly consists in the features of construction, combinations of elements and the arrangement of parts which shall be exemplified in the construction hereinafter described and of which the scope of application will be indicated in the appended claims.

In the accompanying drawings in which one of the various possible illustrative embodiments of this invention is shown, Figure 1 is a top plan view of a chart evaluator embodying the invention, Figure 2 is a cross-sectional view taken along the line 2—2 of Figure 1, while Figure 3 is a fragmentary plan view with portions broken away and shown in cross-section to illustrate the elastic scale and the chart advancing adjustments.

The chart evaluator herein provided consists essentially of a small table or stand having a tilt top to facilitate the reading of the charts with reference to a scale member. The charts may be of the single or multiple record types. In the multiple record type, the curves to be evaluated are usually in different colored inks; the particular curve being read with respect to a similarly colored reference line and scale provided on the scale member.

The chart herein illustrated, is of the multiple record type as recorded by the recording and measuring instrument disclosed in a copending application bearing Serial No. 588,600 and filed on April 16, 1945, by Robert W. Hyde and myself. A series of circular openings are provided along both edges of the chart to receive the sprocket wheels of the chart advancing mechanism. Due to changes in width of the chart caused by variations in humidity and temperature, one of the sprocket wheels is made laterally adjustable to compensate for the change in chart width. The end of the chart is inserted beneath the transparent scale member and fed through the evaluator by the advancing mechanism.

The transparent scale member consists of three strips, the upper and lower strips being of a transparent plastic and fixed to the top of the stand. The upper strip is unmarked, while the lower strip carries the colored reference lines herein referred to, as well as scale numerals. The middle strip is made of an elastic, transparent plastic, such as polyvinyl chloride or ethyl cellulose, and marked with scale subdivisions and reference lines. The elastic scale piece may be expanded or contracted by means of abutment screws fixed thereto at both ends to align the reference markings thereon with the reference lines appearing on the chart.

The chart evaluator is further characterized by the addition of timing wheels to the chart advancing mechanism. By aligning a time reference mark on the chart with a reference line on the scale member, and setting the time wheels to the known time when the mark was made, the time any point was recorded on the chart may be ascertained by a reading of the time wheels during the advance of the chart through the evaluator.

Referring now in detail to the drawing, 10 designates a chart evaluator embodying the invention. The evaluator comprises a small portable stand 11 made of sheet metal, having two end walls 12 and 13 and a tilted top wall 14 formed with a longitudinally disposed opening 15. The bottoms of the end walls 12 and 13 are bent inwardly to form the feet 16 for the stand. Resilient pads 17 are affixed to the feet to prevent the scratching or marring of a table or desk top upon which the evaluator may rest.

Fixed on the under side of the top wall 14 and at the edges of the opening 15 therein, are two S-shaped members 18 to form a channel or guide. Slideably received within the guide thus formed are two U-shaped slides 19 and 20; slide 19 being adjacent to the end wall 12 while slide 20 is adjacent to the wall 13. Fixed to the outer ends of said members, as by screws 21, are upstanding threaded members 22 and 23, respectively. Integral with said top wall near the end walls, and extending across the opening 15 are two abutment members 24 and 25 (Figures 2 and 3); an abutment member being provided for each of the slides 19 and 20 and located inwardly of their respective threaded members. Each of the abutment members is provided with a depending circular tab or tongue 26 and 27, respectively. Threaded through the members 22 and 23 are the threaded rods 28, the inwardly extending ends of said rods being adapted to abut the tongues of the abutment members. A knob 29 is fixed to the outwardly extending ends of said rods to facilitate the turning of the same. Rotation of the knobs 29 will cause the respective slide members 19 and 20 to move inwardly or outwardly, as the case may be, for the purposes hereinafter appearing.

A scale member 30 is provided for the evaluator fixed as by the screws 31, to the top side of the wall 14 and covering the opening 15 therein. The scale member comprises an upper strip 32 made of a clear, transparent plastic and a lower strip 33 made of a similar material. Separating the two strips are two narrow elongated members 34 forming an elongated opening therebetween. Slideably received within the opening thus formed is a scale piece 35 made of an elastic transparent plastic such as polyvinyl chloride or ethyl cellulose. The ends of said scale piece are fastened by the screws 36, to the threaded members 22 and 23 on the slides 19 and 20, respectively.

The lower scale strip 33 is provided with four scale designations and markings 37 and four reference lines 38, preferably in colors of different hues. The strip 33 is further provided with horizontal arrowhead reference markings 40 placed in the center of said strip toward the upper edge thereof. The scale piece 35 is marked with the scale divisions and sub-divisions 41. The scale piece 35 is further provided with vertical arrowhead reference markings 39.

Upon the insertion of a chart 42 beneath the scale member 30, the various curves traced thereon will be visible through the transparent scale member. The chart 42 is provided with a series of circular openings 43 for the chart advancement mechanism hereinafter described. Traced along the outer edges of the chart are the alignment reference markings 44 traced thereon at the time the curves were recorded. Due to the variations in temperature and humidity, it is quite possible that dimensional changes will have taken place in the chart. For this reason, prior to evaluating the chart, the alignment reference markings 44 must coincide with the arrowhead markings 39 on the elastic scale piece 35. The marks 39 may readily be made to coincide with the reference lines 44 by rotation of the knobs 29 to either expand or contract the scale piece 35.

The chart 42 is advanced through the evaluator by means of a horizontal shaft 46 journaled through the side walls 12 and 13, the extending ends of which are provided with the knobs 47 to facilitate the rotation thereof. Fixed to the shaft 46 are two sprocket wheels; the sprocket wheel 48 illustrated (Figure 3) being fixed to said shaft by a pin and slot connection 49. The sprocket wheels are received within the openings 43 provided along both edges of the chart 44. Rotation of the shaft 46 in a counter-clockwise direction (Figure 2) will advance the chart through the evaluator. By reason of the pin and slot connection provided for the sprocket wheel 48, the advancing mechanism may be accommodated to the varying dimensional widths of the chart 42 due to ambient variations. A spring pressed member 50 pivoted to the top wall 14 as at 51, maintains the chart in engagement with the sprocket wheels.

Mounted on the shaft 46 are two time wheels, an hour wheel 52 and a minute wheel 53; both held in place thereon by a clamp 54 fixed to said shaft. The time wheels are mounted on said shaft to permit individual settings thereof. The minute wheel 53 is adapted to be rotated upon rotation of the shaft 46, while the hour wheel 54 will be rotated upon the rotation of said shaft, by a reduction gear train generally designated as at 55. A cover or guard 56 is provided to enclose the gear train. A reference arrow 57 is provided for indicating the time of wheels 52 and 53.

In operation, the chart 42 is inserted under the scale member 30. The chart is then aligned in the evaluator, the sprocket wheels engaging the circular openings 43 in the chart with member 50 holding the chart against the wheels. Shaft 46 is then rotated until a time reference mark 58 on the chart coincides with the arrowhead reference markings 40 on the scale member. The time when mark 58 was made being known, the shaft 46 is held against rotation while the time wheels 52 and 53 are set with reference to the arrow 57.

The scale piece 35 is then expanded or contracted to bring into coincidence the reference arrowheads 39 with the reference lines 44 marked on the chart. The chart is then advanced through the evaluator upon rotation of the shaft 46. The time at which any particular reading was recorded may be found by a reading of the time wheels with respect to the reference arrow.

It will thus be seen that there is provided a chart evaluator in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A chart evaluator comprising a support for a chart, an elastic scale marked in scale graduations and with alignment reference points at both ends of said scale, means for varying the length of said scale for bringing into coincidence the two reference points on said scale with two similar reference points recorded on the chart, means for advancing the chart through said evaluator, a time mechanism driven by said chart advancing means, a time reference point associated with said scale adapted to be aligned with a similar time reference point recorded on said chart, said time mechanism being adapted to be set with the known time of the time reference recordation whereby the time any point was recorded on said chart will be indicated by said time mechanism upon coincidence of the recorded point with said scale as said chart is advanced through said evaluator.

2. A chart evaluator comprising a support for a chart, an elastic scale marked in scale graduations and with alignment reference points at both ends of said scale, means associated with each end of said scale for varying the length thereof for bringing into coincidence the two reference points on said scale with two similar reference points recorded on the chart, means for advancing the chart through said evaluator, a time mechanism driven by said chart advancing means, a time reference point associated with said scale adapted to be aligned with a similar time reference point recorded on said chart, said time mechanism being adapted to be set with the known time of the time reference recordation whereby the time any point recorded on said chart will be indicated by said time mechanism upon coincidence of the recorded point with said scale as said chart is advanced through said evaluator.

3. A chart evaluator for reading a chart having recorded thereon a plurality of graphs, alignment and time reference lines comprising, a support for said chart, a transparent scale member fixed to said support and marked with a plurality of lines running longitudinally thereof and scale markings associated with each of said lines; a second transparent member fixed over said first member and spaced therefrom, an elastic transparent scale piece disposed between said transparent members and marked with scale graduations cooperating with the lines of said first transparent scale member, and alignment reference lines; means on said support for varying the length of said scale piece, to bring into coincidence the reference lines thereon with the alignment reference lines recorded on said chart, and a chart advancing means on said support for moving the chart under said scale members through said evaluator.

4. A chart evaluator for reading a chart having recorded thereon a plurality of graphs, alignment and time reference lines comprising, a support for said chart, a transparent scale member fixed to said support and marked with a plurality of lines running longitudinally thereof, scale markings associated with each of said lines, and a time reference line; a second transparent member fixed over said first member and spaced therefrom, an elastic transparent scale piece disposed between said transparent members and marked with scale graduations cooperating with the lines of said first transparent scale member, and alignment reference lines; means on said support for varying the length of said scale piece, to bring into coincidence the reference lines thereon with the alignment reference lines recorded on said chart, a chart advancing means on said support for moving the chart under said scale members through said evaluator, and a time mechanism driven by said advancing means for indicating with respect to the time reference line recorded on said chart, the time any given point on said chart was recorded as said chart is advanced through said evaluator.

5. A chart evaluator for reading a chart having recorded thereon a plurality of graphs, alignment and time reference lines comprising, a stand, a guide member on said stand, a transparent scale member fixed to said stand over said guide member and marked with a plurality of lines running longitudinally thereof, scale markings associated with each of said lines, and a time reference line; a second transparent member fixed over said first member and spaced therefrom, an elastic transparent scale piece disposed between said transparent members and marked with scale graduations cooperating with the lines of said first transparent scale member, and alignment reference lines; a pair of slides in said guide member, an end of said scale piece being fixed to each of said slides, means for moving said slides in said guide member to vary the length of said scale piece, to bring into coincidence the reference lines thereon with the alignment reference lines recorded on said chart, a chart advancing means on said stand for moving the chart under said scale members, and a time mechanism driven by said advancing means for indicating with respect to the time reference line recorded on said chart, the time any given point on said chart was recorded as said chart is advanced through said evaluator.

6. A chart evaluator for reading a chart having recorded thereon a plurality of differently colored graphs, alignment and time reference lines comprising, a stand having a longitudinally disposed opening therein, a guide member disposed adjacent to said opening, a transparent scale member fixed over said opening and marked with a plurality of differently colored lines running longitudinally thereof, scale markings associated with each of said lines, and a time reference line; a second transparent member fixed over said first member and spaced therefrom, an elastic transparent scale piece disposed between said transparent members and marked with scale graduations cooperating with the lines of said first transparent scale member, and alignment reference lines; a pair of slides in said guide member, an end of said scale piece being fixed to each of said slides in said guide member, a threaded rod mounted on said stand for each of said slides for moving said slides in said guide member to vary the length of said scale piece, to bring into coincidence the reference lines thereon with the alignment reference lines recorded on said chart, a chart advancing means for moving the chart under said scale members through said evaluator, and an hour wheel and a minute wheel driven by said advancing means, said time wheels being adapted to be set in accordance with a known time upon alignment of the time reference line on said chart with the time reference line on said first transparent scale member whereby the time any given point on said chart was recorded is indicated as said chart is advanced through said evaluator.

JAMES E. BEVINS.

REFERENCES CITED

The following references are of record in the file of this patent:

UNITED STATES PATENTS

| Number | Name | Date |
|---|---|---|
| 120,621 | Chassaing | Nov. 7, 1871 |
| 280,328 | Putnam | June 26, 1883 |
| 2,156,524 | Christensen | May 2, 1939 |
| 2,256,116 | Hughes | Sept. 16, 1941 |
| 2,270,461 | Mills | Jan. 20, 1942 |
| 2,313,480 | Reid | Mar. 9, 1943 |
| 2,418,985 | Posey | Apr. 15, 1947 |

FOREIGN PATENTS

| Number | Country | Date |
|---|---|---|
| 508,923 | Great Britain | July 7, 1939 |